United States Patent
Ibi et al.

(10) Patent No.: US 7,589,685 B2
(45) Date of Patent: Sep. 15, 2009

(54) GLASS ANTENNA

(75) Inventors: Toshiaki Ibi, Inagi (JP); Shigeru Hashimoto, Inagi (JP); Toru Maniwa, Kawasaki (JP); Akihide Sano, Kanagawa (JP)

(73) Assignees: Fujitsu Limited, Kawasaki (JP); Fujitsu Frontech Limited, Tokyo (JP); Nippon Sheet Glass Co., Ltd, Tokyo (JP)

( * ) Notice: Subject to any disclaimer, the term of this patent is extended or adjusted under 35 U.S.C. 154(b) by 0 days.

(21) Appl. No.: 11/332,142

(22) Filed: Jan. 17, 2006

(65) Prior Publication Data

US 2007/0052602 A1    Mar. 8, 2007

(30) Foreign Application Priority Data

Sep. 7, 2005    (JP)    ............... 2005-259918

(51) Int. Cl.
*H01Q 1/06*    (2006.01)
*H01Q 1/38*    (2006.01)

(52) U.S. Cl. ................. 343/721; 343/700 MS
(58) Field of Classification Search .......... 343/700 MS, 343/721, 711, 713
See application file for complete search history.

(56) References Cited

U.S. PATENT DOCUMENTS 5,446,470 A    8/1995    Avignon et al.
6,697,020 B2 *    2/2004    Ying .................. 343/702
6,788,256 B2 *    9/2004    Hollister .............. 343/700 MS
2004/0021610 A1    2/2004    Hickel

FOREIGN PATENT DOCUMENTS

| DE | 101 47 066 A1 | 4/2003 |
|---|---|---|
| GB | 2 290 417 A | 12/1995 |
| JP | 61-176201 A | 8/1986 |
| JP | 10-233612 | 9/1998 |
| JP | 2000-138512 | 5/2000 |
| JP | 2000-259087 | 9/2000 |
| WO | WO 02/25770 A1 | 3/2002 |

OTHER PUBLICATIONS

European Search Report, dated Apr. 19, 2006, issued in corresponding European Application No. 06 10 0652.

* cited by examiner

*Primary Examiner*—Hoang V Nguyen
*Assistant Examiner*—Robert Karacsony
(74) *Attorney, Agent, or Firm*—Westerman, Hattori, Daniels & Adrian, LLP.

(57) ABSTRACT

To provide a compact and low-cost glass antenna in which an antenna position can be easily recognized by emitting a light near the antenna position, and thus a passerby or the like can easily grasp the position when he or she holds up a tag. The glass antenna has plate-like glasses 11A and 11B, antennas 12A and 12B provided on the plate-like glasses 11A and 11B, and a light emitting unit 16a that is provided so as at least a part thereof to be overlapped with the antennas as seen from the direction that the antennas 12A and 12B are directed, and scatters the light guided by the plate-like glasses 11A and 11B to emit light in the vicinity of the antenna.

12 Claims, 7 Drawing Sheets

LIGHT SOURCE (LED)

LIGHT SOURCE
(LED)

LIGHT SOURCE
(LED)

GLASS ANTENNA

BACKGROUND OF THE INVENTION

1. Field of the Invention

The present invention relates to a glass antenna having a light emitting function. The invention particularly relates to a glass antenna applied to a gate antenna or the like aimed to be used, for example, in an RFID (Radio Frequency Identification) system, or to draw and navigate shop visitors, etc.

2. Description of the Related Art

In the gate antenna in the RFID system, there is known a method of notifying a check sign (warning or guidance) to a passing person based on information read from a tag, or a method of notifying by illuminating a glass surface for navigating the shop visitors and the like.

For example, when an authority confirmation is performed from tag information as a check sign, a using state for lighting a red lamp at warning time and lighting a blue lamp at permitting time is known. Moreover, another using state for requesting to hold up a visitor card (tag) by flashing an antenna unit as a navigation, is known.

To realize them, in a conventional system configuration, a gate antenna includes, as shown in FIG. 12, an antenna 1 for reading a tag, and a light emitting unit (display unit) 2, which are provided independently from one another. Accordingly, the antenna 1 and the light emitting unit 2 are provided at separate positions from one another. Here, the antenna 1 is connected to a PC (Personal Computer) 4 through an RFID reader/writer 3. Further, the light emitting unit 2 is connected to the PC 4, and is controlled to emit a light.

Incidentally, as a reference conventional art, a Patent Document 1 (Jpn. Pat. Appln. Laid-Open Publication No. 2000-138512) is known.

However, when the antenna 1 and the light emitting unit 2 are formed at separate positions from one another, in the case where a passerby etc., holds up, for example, a tag, the position for holding up the tag is difficult to be recognized. Thus, there arise problems of mistaking the holding-up position or taking much time to recognize the position. Further, if the antenna 1 and the light emitting unit 2 are formed at separate positions from one another a larger space is needed, and downsizing becomes difficult, and the cost is raised.

SUMMARY OF THE INVENTION

The present invention has been made to solve the above-mentioned conventional problems. An object of the present invention is to provide a compact and low-cost glass antenna in which an antenna position can be easily recognized by emitting a light at the antenna position, and thus a passerby or the like can easily grasp the position when he or she holds up a tag.

To achieve the above-mentioned object, the glass antenna of the present invention includes a plate-like glass, an antenna provided on the plate-like glass, and a light emitting unit that is provided so as at least a part thereof to be overlapped with the antenna as seen from a direction that the antenna is directed and scatters a light guided by the glass to emit the light in the vicinity of the antenna.

Here, the antenna has either of an element or a ground of the antenna provided on either of two surfaces of the plate-like glass, and the other one of the element or the ground of the antenna provided on the other surface of the plate-like glass.

Further, the light emitting unit is formed of a ground glass obtained by a glass grinding process in the front surface of the plate-like glass.

Furthermore, the light emitting unit is formed of a translucent film provided on the front surface of the plate-like glass.

Moreover, the plate-like glass has a front surface side plate-like glass and a rear surface side plate-like glass provided in a direction that the antenna is directed, either one of the element or the ground of the antenna and the light emitting unit are provided between the front surface side plate-like glass and the rear surface side plate-like glass.

Moreover, the light emitting unit is formed by providing the translucent film on the front surface of the rear surface side plate-like glass.

The light for emission is guided to the light emitting unit in either one of the front surface side plate-like glass and the rear surface side plate-like glass, and either one of the front surface side plate-like glass and the rear surface side plate-like glass is constituted of a high transmission glass. Further, a second light emitting unit is provided near the light emitting unit. Moreover, the light emitting unit is provided to brighten the periphery of the antenna.

According to the present invention as described above in detail, it is possible to provide a compact and low-cost antenna in which the antenna position can be easily recognized by emitting the light in the vicinity of the antenna position and thus a passerby or the like can easily grasp the position when he or she holds up the tag.

DETAILED DESCRIPTION OF THE PREFERRED EMBODIMENTS

Now, embodiments of the present invention will be described in detail with reference to the drawings.

First Embodiment

Figure 1:
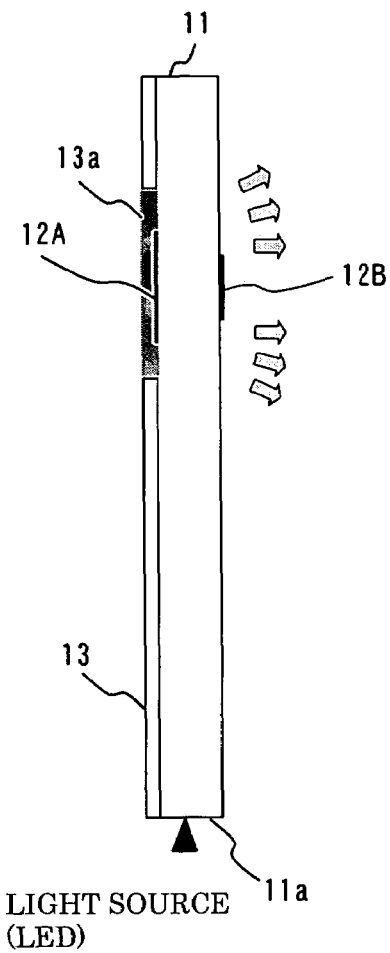
FIG. 1 is a side view showing a first embodiment according to the present invention.

FIG. 1 is a side view showing a first embodiment according to the present invention. A glass antenna shown in FIG. 1 includes a plate-like glass 11, antennas (planar antenna or patch antenna) 12A and 12B provided on the plate-like glass 11, and a light emitting unit 13a. The unit 13a is provided to be overlapped with the antenna as seen from the direction that the antennas 12A and 12B are directed (as seen from front), and scatters a light guided by the plate-like glass 11 to emit the light in the vicinity of the antenna so as to use the antenna 12A as a silhouette.

The light emitting unit 13a is composed of a portion overlapped with the antenna 12A in a transparent film 13 (for example, a PVB (polyvinyl butyral) which is adhered to the rear surface of the plate-like glass 11 including the antenna ground 12A and a light scattering portion where the peripheral portion of the overlapped portion is made translucent (white).

The antennas 12A and 12B are provided in such a manner that the antenna element 12B prints a silver (Ag) film directly on the front surface of the plate-like glass 11. And, the antennas 12A and 12B are provided in such a manner that the antenna ground 12A prints a silver (Ag) film directly on the rear surface of the plate-like glass 11.

Figure 2:
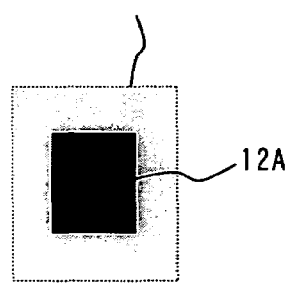
FIG. 2 is a front view of an antenna unit as seen from the direction of an antenna of FIG. 1.

The antenna ground 12A visually recognized from the direction of the antenna has a size larger than the antenna element 12B. As shown in FIG. 2, the shape of the antenna ground 12A is emerged at the central part of the light emitting unit 13a as a silhouette by the light emitted from the light emitting unit 13a and the periphery thereof emits light.

In the above-mentioned configuration, the light emitted from an LED as a light emission source is introduced from a lower end portion 11a of the plate-like glass 11. Then, the light emitting unit (translucent portion) 13a scatters the light. As seen in the direction from the front of the antenna, as shown in FIG. 2, the periphery of the antenna shines in the shape of the light emitting unit as the antenna (antenna ground) as a silhouette. Incidentally, light emitting timing can be freely designated, such as, by flash-display according to an instruction from a host PC. Further, as a light emitting color, color lighting can be freely performed similarly by controlling from the host PC or the like by adopting a multicolor LED.

Thus, a passerby or the like who intends to hold up the tag at the antenna can easily and rapidly recognize the position. According to the first embodiment, the glass antenna is composed of one plate-like glass. Thus, the very simple and low cost configuration can be attained.

Incidentally, in the above-mentioned first embodiment, the film 13 is provided on the rear surface of the plate-like glass 11. Alternatively, however, even if the film 13 is provided on the front surface side of the antenna element 12B at the front surface side of the plate-like glass 11, the simple configuration can be similarly obtained. Incidentally, the first embodiment has an advantage that, since the film 13 is provided on the front surface side of the plate-like glass 11, an improvement (regulation) of antenna characteristics to be described later with reference to a third embodiment is possible.

Second Embodiment

Figure 3:
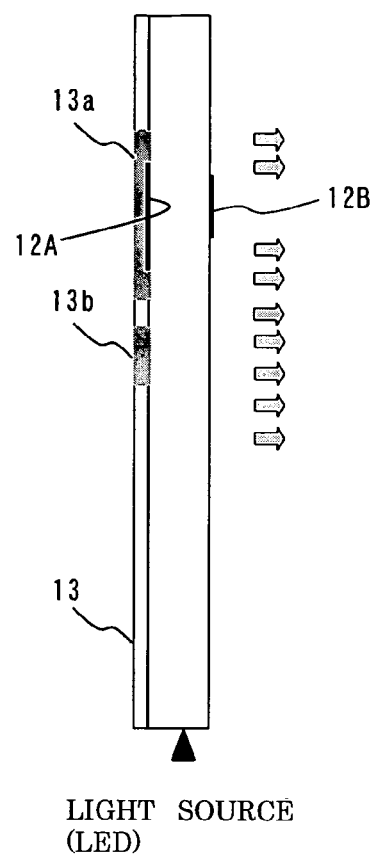
FIG. 3 is a side view showing a second embodiment according to the present invention.
Figure 4:
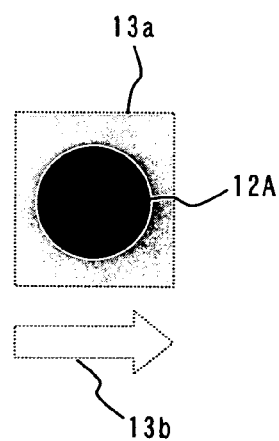
FIG. 4 is a front view of the antenna unit as seen from the direction of the antenna of FIG. 3.

A second light emitting unit 13b (translucent portion) of the other light emitting unit is formed near the light emitting unit of the film described in the first embodiment. Thus, for example, as shown in FIG. 3 and FIG. 4, a predetermined display portion of a passing direction, etc., can be formed near the light emitting unit of the antenna. Further, as apparent from FIG. 4, the shape of the silhouette and the light emitting shape can be changed by changing the shape of the antenna ground 12A.

Third Embodiment

The above-mentioned first and second embodiments can be constituted very simply at a low cost. On the other hand, since the antenna characteristics are determined according to the characteristics of a glass material. It is difficult to regulate the characteristics of the glass material. Further, since the film is exposed on the rear surface of the plate-like glass, it is easily peeled off. Therefore, in the third embodiment, the glass antenna which can solve above drawbacks will be described.

Figure 5:
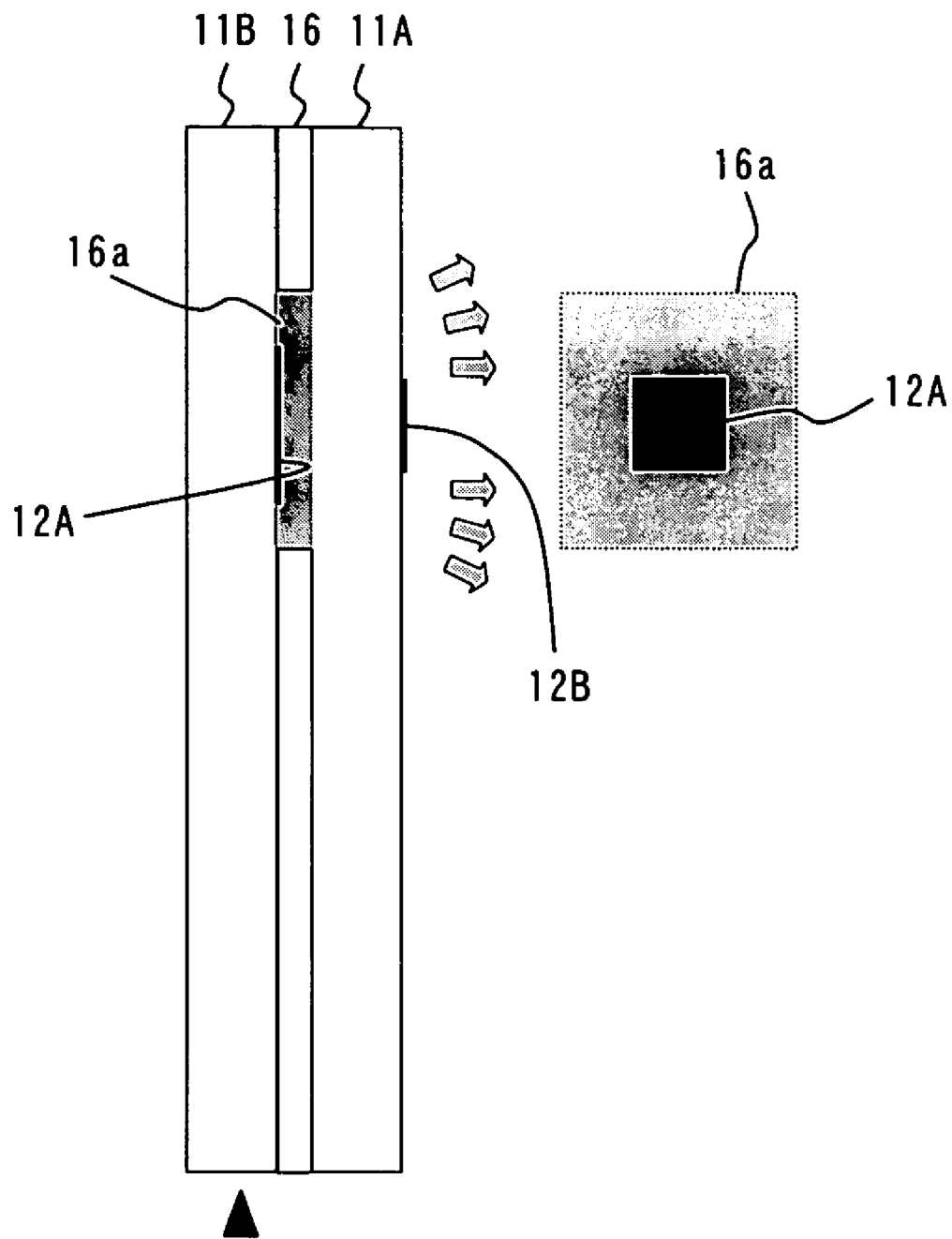
FIG. 5 is a side view showing a third embodiment according to the present invention.
Figure 6:
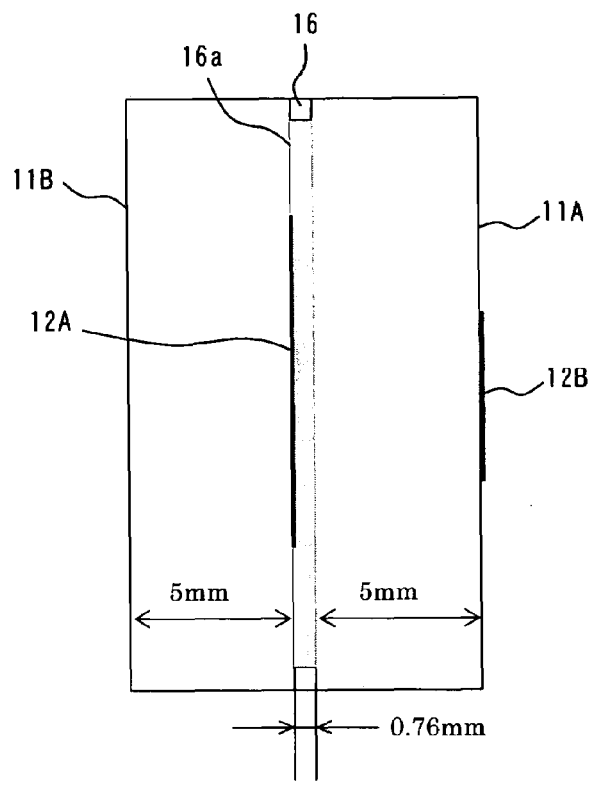
FIG. 6 is a partly enlarged side view of the antenna unit of FIG. 5.
Figure 7:
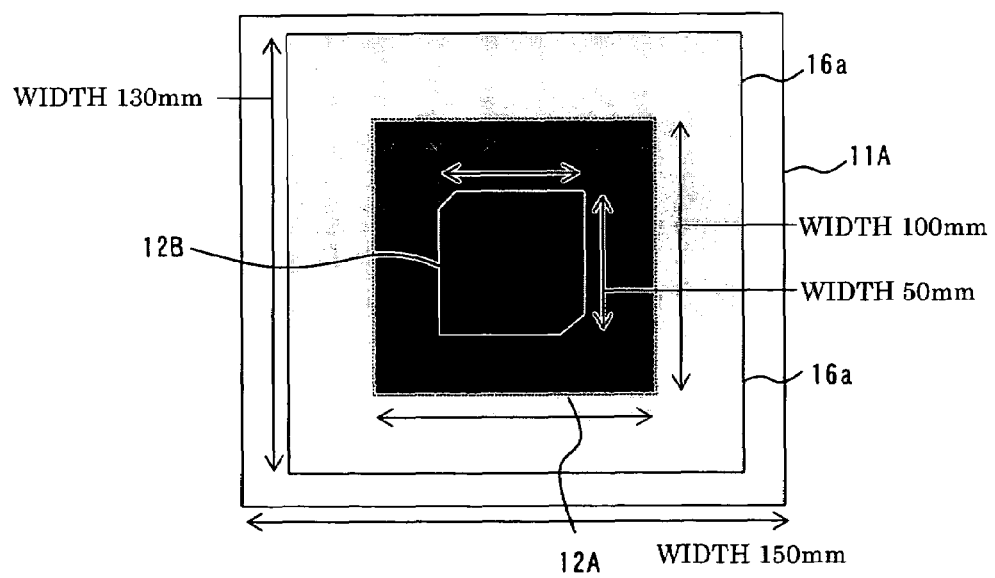
FIG. 7 is a front view of FIG. 6.

FIG. 5 is a side view showing the third embodiment of the present invention. FIG. 6 is a partly enlarged side view of the antenna unit of FIG. 5, and FIG. 7 is a front view of FIG. 6.

In the third embodiment, the plate-like glass 11 shown in FIG. 1 is composed of a pair (laminated glass) of a front surface side plate-like glass 11A provided on the front surface side in the direction that the antenna is directed, and rear surface side plate-like glass 11B provided on the rear surface thereof. A light emitting unit 16a of an intermediate film (film: PVB) 16 and an antenna ground 12A are provided between the front surface side plate-like glass 11A and the rear surface side plate-like glass 11B. Further the light from the LED is introduced from the lower end of the rear surface side plate-like glass 11 B.

More particularly, the antenna element 12B is provided by printing a silver (Ag) film on the front surface of the front surface side plate-like glass 11A. The light emitting unit 16a of the intermediate film 16 is provided on the rear surface of the front surface side plate-like glass 11A. The antenna ground 12A is provided by printing a silver (Ag) film on the front surface of the rear surface side plate-like glass 11B between the intermediate film 16 and the rear surface side plate-like glass 11B.

In this third embodiment, the intermediate film 16 functions, in addition to connect the front and rear plate-like glasses 11A and 11B, to improve (regulate) the antenna characteristics showing difficulty in the first embodiment. More particularly, the permittivity e of the glass (a coefficient showing the relation between a charge in a substance and a force given by the charge) can be lowered. The gain of the antenna can be increased by lowering the permittivity. Further, this intermediate film 16 is used to determine a light emitting range. Only the light emitting unit which is desired to emit light is made translucent (white) and the rest is made transparent. Thus, the light irradiated to the lower side glass edge part passes through the transparent glass, and can emit white light by diffusely reflected at the part of the intermediate film.

Incidentally, FIG. 6 and FIG. 7 enlargedly showing the antenna portions, show the sizes of their components. As seen from the front, the antenna ground 12A is 100 mm long in longitudinal and lateral directions. The antenna element 12B is 50 mm long in longitudinal and lateral directions. The light-emitting unit (white part) 16a is 130 mm long in longitudinal and lateral directions. The width of each of the plate-like glasses 11A and 11B is 150 mm. Further, the thicknesses of the front surface side and the rear surface side plate-like glasses are both 5 mm. The thicknesses of the transparent portion and the translucent portion of the intermediate film are both 0.76 mm or 0.38 mm. As seen from the front, the light emitting unit 16a has a size larger than the antenna ground 12A. The light emitted from the light emitting unit can be recognized from the periphery of the antenna (antenna element 12B).

It is needless to say that these sizes are determined so as not to lower the antenna characteristics due to the permittivity or the like of the film, that is the intermediate film.

As described above, according to the third embodiment, by the intermediate film 16, regulation of the antenna characteristics is easy. Further, the laminated glass is used. Accordingly, the strength can be raised as compared with the first embodiment that a single plate-like glass is used. Furthermore, the light emitting unit can be formed at the inside of the laminated glass. Accordingly, the third embodiment is more excellent than the first embodiment in view of a design and strength (peel-off preventing function).

Fourth Embodiment

Figure 8:
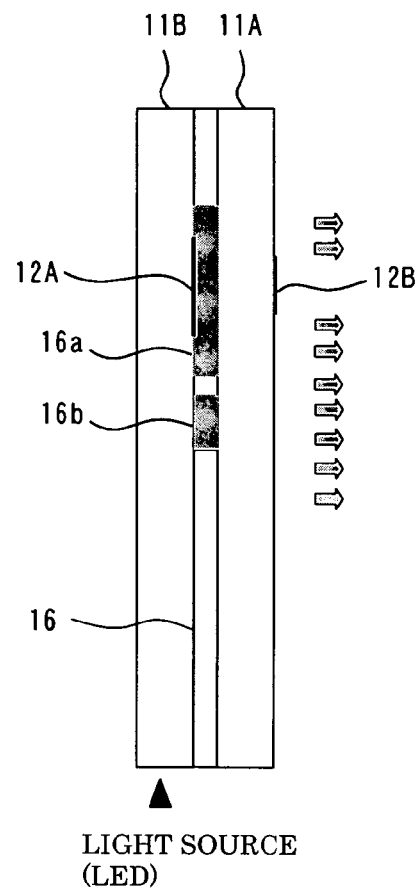
FIG. 8 is a side view showing a fourth embodiment according to the present invention.
Figure 9:
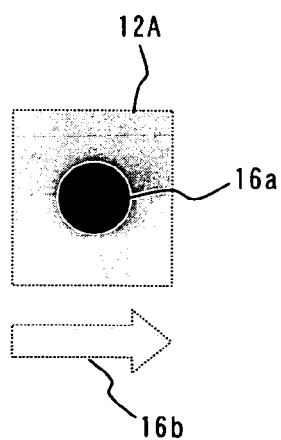
FIG. 9 is a front view showing the fourth embodiment according to the present invention.

FIG. 8 and FIG. 9 are a side view and a front view respectively showing a fourth embodiment. In the fourth embodiment, a predetermined display portion having a second light emitting unit 16b of the other light emitting unit is formed near the light emitting unit 16a in the third embodiment, corresponding to the second embodiment.

Fifth Embodiment

Figure 10:
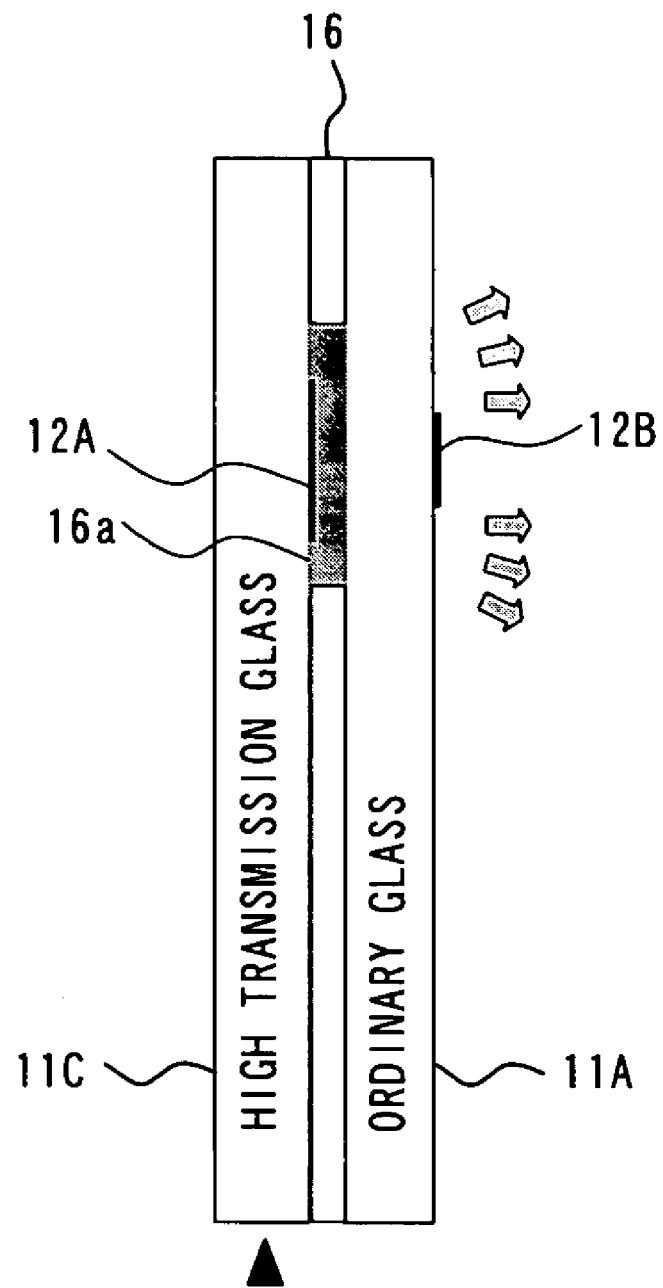
FIG. 10 is a side view showing a fifth embodiment according to the present invention.

FIG. 10 is a side view showing a fifth embodiment. With regard to configuration of the third embodiment, in the fifth embodiment, a rear surface side plate-like glass is constituted of a high transmission glass 11C which has extremely high transmittance of the light, instead of an ordinary glass. The light is guided by the high transmission glass 11C.

According to such a configuration, the attenuation of the light can be suppressed to minimal. Brighter light emission can be obtained by the same power. Further, the size reduction of the light emission source, such as an LED is enabled. Moreover, the attenuation of the light due to the glass is small. Accordingly, the light can be transmitted uniformly through the entire glass surface including the glass on the side. Incidentally, the front surface side plate-like glass 11A may be constituted of a high transmission glass and the light may be guided in the front surface side plate-like glass 11A.

Sixth Embodiment

Figure 11:
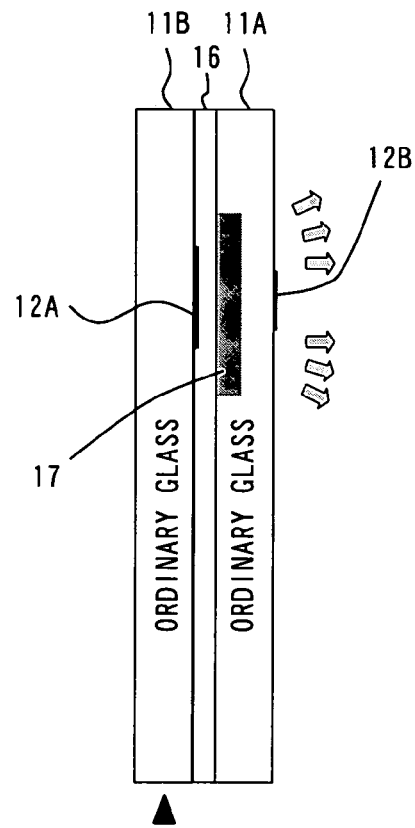
FIG. 11 is a side view showing a sixth embodiment according to the present invention.
Figure 12:
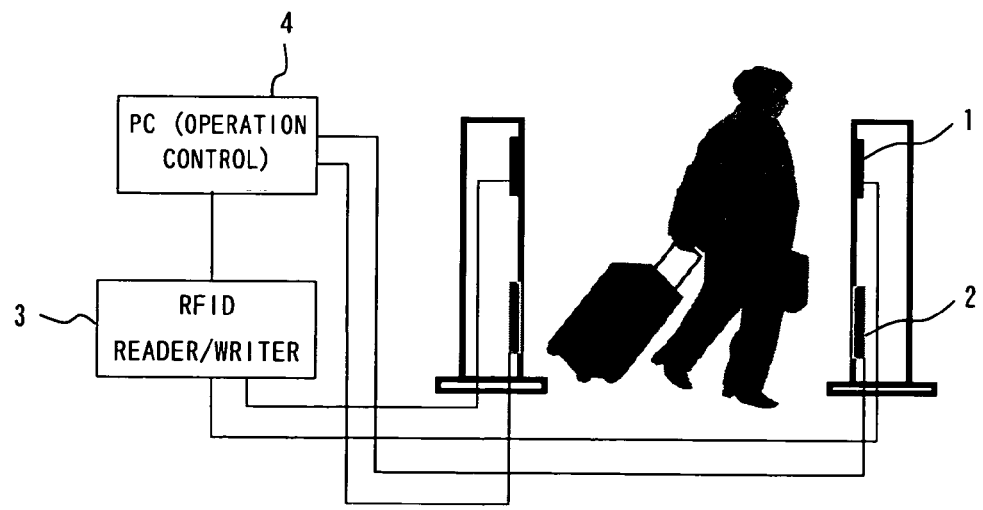
FIG. 12 is a schematic structural view for explaining a conventional art.

FIG. 11 is a side view showing a sixth embodiment. The sixth embodiment includes a ground glass portion 17 formed on the front surface side plate-like glass 11A, instead of forming the light emitting unit in the intermediate film 16 in the configuration of the embodiment 3. Thus, the ground glass portion 17 is used as the light emitting unit. In this case, the intermediate film 16 and the ground glass portion 17 carry out the antenna characteristics.

According to such a configuration, it is not necessary to form the light emitting unit in the intermediate film 16. Further, the degree of freedom of regulating the antenna characteristics can be increased.

What is claimed is:

1. A glass antenna comprising:
a plate-like glass,
an antenna provided on the plate-like glass, and
a visible light emitting unit that is provided so as at least a part thereof is overlapped with the antenna as seen from a direction that the antenna is directed and scatters a visible light guided by the glass to emit visible light in a direction of the antenna so as to silhouette the antenna with the visible light, wherein said antenna comprises an area which is visible to a passerby when the visible light emitting unit is operational; and wherein the visible light emitting unit is located directly behind the antenna when viewed from a direction perpendicular to a plane the antenna lies in.

2. The glass antenna according to claim 1, wherein
the antenna has either of an element or a ground of the antenna provided on either of two surfaces of the plate-like glass, and the other one of the element or the ground of the antenna provided on the other surface of the plate-like glass.

3. The glass antenna according to claim 1, wherein the visible light emitting unit is provided to brighten the periphery of the antenna.

4. The glass antenna according to claim 1, wherein the visible light emitting unit is located directly behind the antenna as viewed from a direction perpendicular to a plane of the antenna having the largest surface area.

5. A glass antenna comprising:
a plate-like glass,
an antenna provided on the plate-like glass, and
a visible light emitting unit that is provided so as at least a part thereof is overlapped with the antenna as seen from a direction that the antenna is directed and scatters a visible light guided by the glass to emit light in a direction of the antenna so as to silhouette the antenna with the visible light, wherein the visible light emitting unit is formed of a ground glass located on a front surface of the plate-like glass; and wherein the visible light emitting unit is located directly behind the antenna when viewed from a direction perpendicular to a plane the antenna lies in.

6. A glass antenna comprising:
a plate-like glass,
an antenna provided on the plate-like glass, and
a visible light emitting unit that is provided so as at least a part thereof is overlapped with the antenna as seen from a direction that the antenna is directed and scatters a visible light guided by the glass to emit light in a direction of the antenna so as to silhouette the antenna with the visible light, wherein the visible light emitting unit is formed of a translucent film provided on a front surface of the plate-like glass; and wherein the visible light emitting unit is located directly behind the antenna when viewed from a direction perpendicular to a plane the antenna lies in.

7. A glass antenna comprising:
a plate-like glass,
an antenna provided on the plate-like glass, and
a visible light emitting unit that is provided so as at least a part thereof is overlapped with the antenna as seen from a direction that the antenna is directed and scatters a visible light guided by the glass to emit light in a direction of the antenna so as to silhouette the antenna with the visible light,
wherein the plate-like glass has a front surface side plate-like glass and a rear surface side plate-like glass provided in a direction that the antenna is directed,
either one of an element or a ground of the antenna and the visible light emitting unit are provided between the front surface side plate-like glass and the rear surface side plate-like glass; and wherein the visible light emitting unit is located directly behind the antenna when viewed from a direction perpendicular to a plane the antenna lies in.

8. The glass antenna according to claim 7, wherein the visible light emitting unit is formed by providing a translucent film on a front surface of the rear surface side plate-like glass.

9. The glass antenna according to claim 7, wherein the light for emission is guided to the visible light emitting unit in either one of the front surface side plate-like glass and the rear surface side plate-like glass.

10. The glass antenna according to claim 9, wherein
the front surface side plate-like glass comprises a lower transmission glass than the rear surface side plate-like glass.

11. A glass antenna comprising:
a plate-like glass,
an antenna provided on the plate-like glass, and
a visible light emitting unit that is provided so as at least a part thereof is overlapped with the antenna as seen from a direction that the antenna is directed and scatters a visible light guided by the glass to emit light in a direction of the antenna so as to silhouette the antenna with the visible light, wherein a second light emitting unit is provided near the visible light emitting unit; and wherein the visible light emitting unit is located directly behind the antenna when viewed from a direction perpendicular to a plane the antenna lies in.

12. The glass antenna according to claim 11, wherein said antenna comprises an area which is visible to a passerby when the visible light emitting unit is operational.

* * * * *